United States Patent [19]

Nishiwaki et al.

[11] Patent Number: 5,416,665
[45] Date of Patent: *May 16, 1995

[54] VEHICLE ELECTROMAGNETIC CLUTCH CONTROL DEVICE

[75] Inventors: Fumihiko Nishiwaki; Munehiko Mimura; Hiroyoshi Nishizaki, all of Hyogo, Japan

[73] Assignee: Mitsubishi Denki Kabushiki Kaisha, Tokyo, Japan

[*] Notice: The portion of the term of this patent subsequent to Jan. 12, 2010 has been disclaimed.

[21] Appl. No.: 864,612

[22] Filed: Apr. 7, 1992

[30] Foreign Application Priority Data

Apr. 19, 1991 [JP] Japan .................................. 3-088061
May 17, 1991 [JP] Japan .................................. 3-112697
May 23, 1991 [JP] Japan .................................. 3-118492

[51] Int. Cl.$^6$ ............................................. F16D 27/00
[52] U.S. Cl. ................................... 361/154; 361/196; 477/175; 477/176
[58] Field of Search .............. 361/154, 139, 153, 152, 361/196, 171, 172; 192/0.03, 0.032, 84 R, 84 B, 0.075

[56] References Cited

U.S. PATENT DOCUMENTS

| | | | |
|---|---|---|---|
| 4,854,920 | 8/1989 | Mimura | 474/28 |
| 5,072,165 | 12/1991 | Mimura | 318/558 |
| 5,083,273 | 1/1992 | Nishiwaki et al. | 192/0.03 |
| 5,089,804 | 2/1992 | Mimura | 340/453 |
| 5,094,333 | 3/1992 | Mimura | 192/84 R |
| 5,179,496 | 1/1993 | Mimura | 361/154 |
| 5,202,813 | 4/1993 | Vota et al. | 361/154 |

FOREIGN PATENT DOCUMENTS

| | | |
|---|---|---|
| 57-51530 | 3/1982 | Japan . |
| 63-57342 | 3/1988 | Japan . |
| 2233420 | 1/1991 | United Kingdom . |
| 2242249 | 9/1991 | United Kingdom . |
| 2242289 | 9/1991 | United Kingdom . |

OTHER PUBLICATIONS

English language Abstract for Japanese Patent Application (OPI) No. Sho. 63-57342, Mar. 12, 1988.
"Engineering Circuit Analysis", Hayt, Jr. et al, 1986, pp. 27-30, 38-40.

*Primary Examiner*—Howard L. Williams
*Assistant Examiner*—Richard T. Elms
*Attorney, Agent, or Firm*—Sughrue, Mion, Zinn, Macpeak & Seas

[57] ABSTRACT

In a vehicle electromagnetic clutch control device, clutch current calculating means outputs a clutch current analog signal according to given travel control data and engine control data, a current difference detector obtains the difference between the clutch current analog signal and a clutch current feedback signal, a first output transistor is operated according to the difference thus obtained to energize the electromagnetic clutch, the clutch current flowing in a second output transistor is detected with a current detecting resistor, and a voltage corresponding to the clutch current thus detected is applied to an operational amplifier, so as to output the clutch current feedback signal with the aid of a reference resistor, a feedback resistor and the amplification factor thereof. An adjusting resistor is connected in parallel to the reference resistor, to adjust the clutch current. Thus, the adjustment of the clutch current can be achieved without removal of the reference resistor and the feedback resistor from the printed circuit board.

3 Claims, 10 Drawing Sheets

VEHICLE ELECTROMAGNETIC CLUTCH CONTROL DEVICE

BACKGROUND OF THE INVENTION

1. Field of the Invention

This invention relates to a device for controlling an electromagnetic clutch on a vehicle (hereinafter referred to as "a vehicle electromagnetic clutch control device", when applicable).

2. Prior Art

A vehicle electromagnetic clutch control device has been disclosed, for instance, by Japanese Patent Application (OPI) No. Sho. 63-57342 (the term "OPI" as used herein means an "unexamined published application"). The conventional vehicle electromagnetic clutch control device will be described with reference to FIG. 1.

Figure 1:
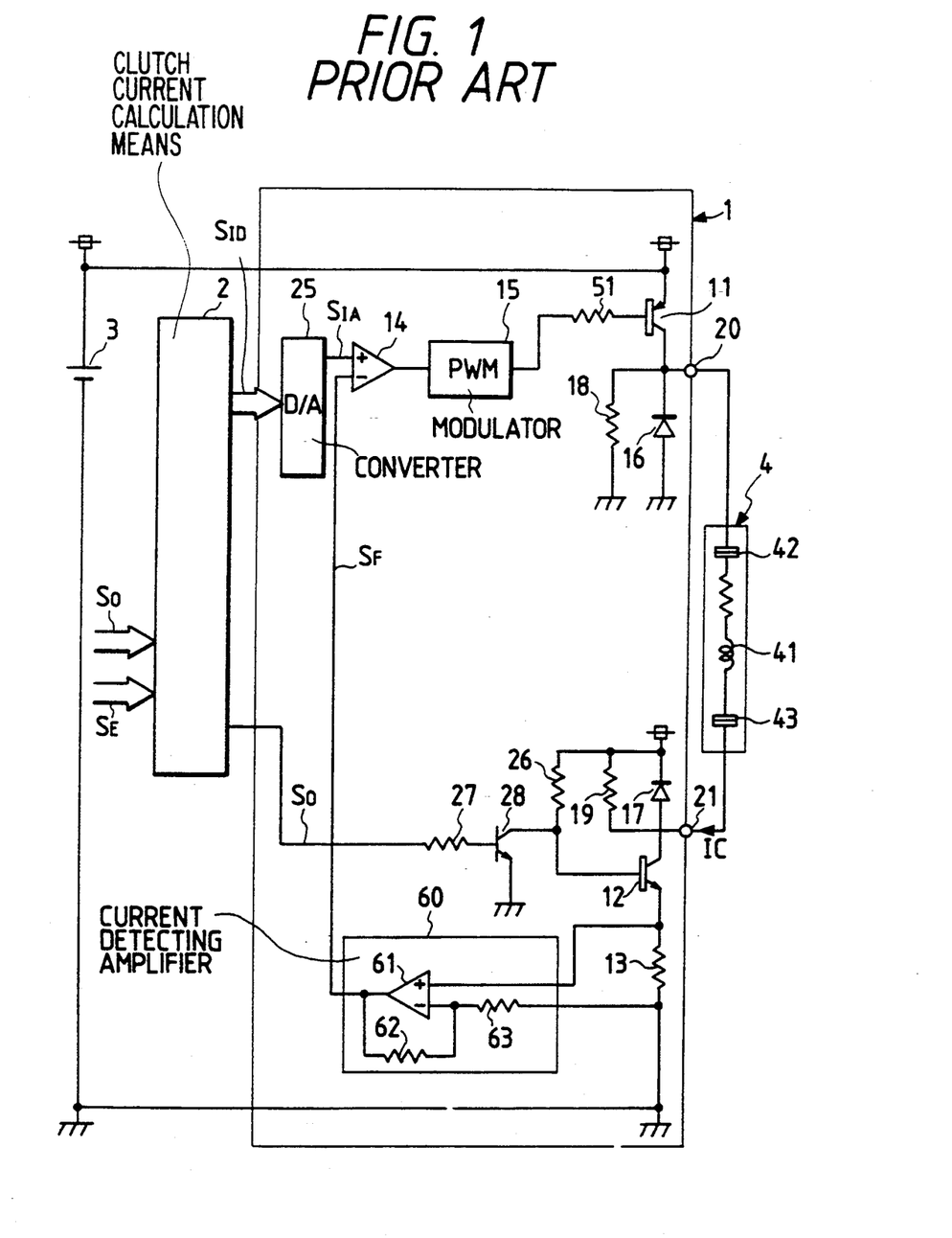
FIG. 1 is a circuit diagram, partly as a block diagram, showing an example of a conventional vehicle electromagnetic clutch control device.

In FIG. 1, reference numeral 1 designates clutch current control means. The control means 1 includes clutch current calculating means 2, to which travel control data SD and engine control data SE are applied. The clutch current calculating means 2 provides a clutch current digital instruction signal SID according to those data SD and SE, which is applied to a digital-to-analog (D/A) converter 25.

In response to the clutch current digital instruction signal SID, the D/A converter 25 outputs an analog signal, namely, a clutch current analog instruction signal SIA, which is applied to the positive input terminal (+) of a current difference detector 14, to the negative input terminal (−) of which a clutch current feedback signal SF provided by a current detecting amplifier 60 is applied.

Thus, the current difference detector 14 obtains the difference between the clutch current analog instruction signal SIA and the clutch current feedback signal SF, to output a difference signal. The difference signal is applied through a pulse width modulation (PWM) modulator 15 and a resistor 51 to the base of an output transistor 11. The emitter of the transistor 11 is connected to a power supply line, to which the positive terminal of a power source 3 is connected. The negative terminal of the power source 3 is grounded. The collector of the output transistor 11 is grounded through a parallel circuit of a feedback diode 16 and a deexciting resistor 18, and is connected to an output terminal 20.

The output terminal 20 is connected through an electromagnetic clutch 4 to another output terminal 21. The electromagnetic clutch 4 comprises slip rings 42 and 43, and a clutch coil 41. Clutch current is applied through the slip rings 42 and 43 to the clutch coil 41.

The aforementioned clutch current calculating means 2 outputs a clutch release signal SO, which is supplied through a base resistor 27 to the base of a clutch release transistor 28. The emitter of the transistor 28 is grounded, and the collector is Connected to the base of an output transistor 12. The base of the transistor 12 is connected through a base resistor 26 to the power source. The collector of the transistor 12 is connected to the output terminal 21 and is connected through a parallel circuit of an over-voltage preventing diode 17 and a deexciting resistor 19 to the power source. The emitter of the output transistor 12 is grounded through a current detecting resistor 13. The resistor 13 is to detect a clutch current.

One terminal of the current detecting resistor 13, which is connected to the emitter of the output transistor 12, is connected to the positive input terminal (+) of an operational amplifier 61 in the current detecting amplifier 60. The other terminal of the current detecting resistor 13, which is grounded, is connected through a reference resistor 63 to the negative input terminal (−) of the operational amplifier 61, which terminal is connected through a feedback resistor 62 to the output terminal thereof.

Figure 2:
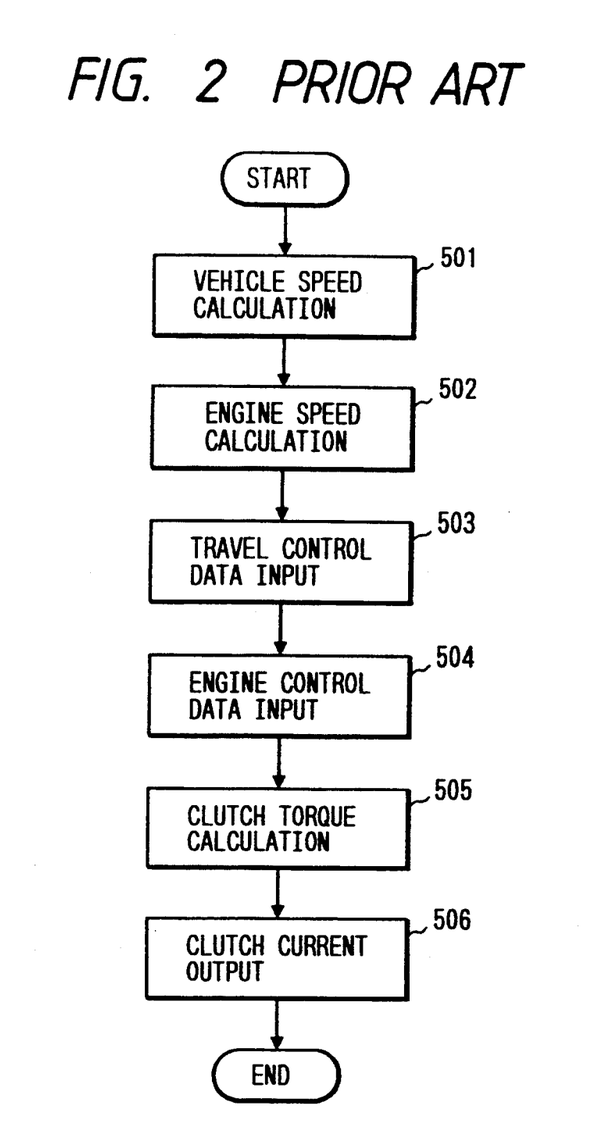
FIG. 2 is a flow chart for a description of the operation of the conventional vehicle electromagnetic clutch control device shown in FIG. 1.

The operation of the control device thus organized will be described with reference to a flow chart of FIG. 2.

First, in Step 501, a vehicle speed is calculated by a control unit (not shown). Then, in Step 502, an engine speed (a number of revolutions per minute of an engine) is calculated by the control unit. In Step 503, in response to the vehicle speed and the engine speed, the aforementioned travel control data SO is applied to the clutch current calculating means 2.

Thereafter, Step 504 is effected. In Step 504, the clutch current calculating means 2 receives the engine control data SE. In Step 505, in response to the travel control data SD and the engine control data SE, the clutch current calculating means 2 calculates clutch torque. In Step 506, the clutch current calculating means 2 outputs the clutch current digital signal SID.

The clutch current digital signal SID is applied to the D/A converter 25, where it is converted into an analog signal, namely, the aforementioned clutch current analog signal SIA. The analog signal SIA is applied to the positive input terminal (+) of the current difference detector 14, to the negative input terminal (−) of which the clutch current feedback signal SF provided by the operational amplifier 61 in the current detecting amplifier 60 is applied. That is, the current difference detector 14 obtains the difference between the clutch current analog signal SIA and the clutch current feedback signal SF, to output a difference signal.

The difference signal is applied to the PWM modulator 15. In the PWM modulator 15, the difference signal is subjected to pulse width modulation. The output of the PWM modulator 51 is applied through the resistor 15 to the base of the output transistor 11. Thus, the output transistor 11 is rendered on and off depending on the pulse width with which the difference signal is modulated by the PWM modulator 15. When the output transistor 11 is rendered conductive (on) or non-conductive (off) in this manner, the clutch current is allowed or not allowed to flow to the electromagnetic clutch 4 through the output terminal 20.

On the other hand, during the ordinary clutch engagement, the output transistor 12 is conductive (on). Therefore, when the output transistor 11 is rendered conductive (on) by the difference signal pulse-width-modulated by the PWM modulator, the clutch current flows in a closed loop of the output transistor 11, the output terminal 20, the electromagnetic clutch 4, the output terminal 21, the output transistor 12, the current detecting resistor 13, and ground.

In this operation, the voltage at one terminal of the current detecting resistor 13 is applied to the positive input terminal (+) of the operational amplifier 61 in the current detecting amplifier 60, while the voltage at the other terminal of the current detecting resistor 13 is decreased by the reference resistor 63. The voltage thus decreased is applied, as a reference voltage, to the negative input terminal (−) of the operational amplifier 61. The reference voltage is further applied through the feedback resistor 62 to the output terminal of the operational amplifier 61, and processed with the amplification factor of the latter 61. Thus, the clutch current feedback signal SF is applied from the output terminal of the operational amplifier 61 to the negative input terminal (−) of the current difference detector 14.

Thus, in accordance with the PWM signal, which is provided by pulse-width modulation of the difference signal outputted by the current difference detector 14, the clutch current is allowed to flow in the electromagnetic clutch 4 to activate the latter.

On the other hand, the electromagnetic clutch 4 is released by the clutch release signal SO outputted by the clutch current calculating means 2. The clutch release signal SO is applied through the base resistor 27 to the base of the clutch releasing transistor 28, to render the latter 28 conductive (on). When the clutch releasing transistor 28 is turned on in this way, the collector potential is decreased, so that the output transistor 12 is rendered non-conductive (off). When the output transistor 12 is rendered non-conductive in this manner, the clutch current is interrupted, so that the clutch is released.

The conventional vehicle electromagnetic clutch control device is designed as described above. That is, in detecting the clutch current IC, the current detecting amplifier 60 amplifies the voltage drop by the clutch current flowing in the current detecting resistor 13 connected to the emitter of the output transistor 12.

Hence, the desired clutch current cannot be obtained because of the fluctuation in characteristic of the current detecting resistor 13, the feedback resistor 62, and the reference resistor 63. Therefore, the gain of the operational amplifier 61 is adjusted by replacing the reference resistor 63. However, the operation of the operational amplifier 61 cannot be ensured without the reference resistor 63. Thus, it is rather difficult to control the gain of the operational amplifier 61.

Now, another example of the conventional vehicle electromagnetic clutch control device will be described with reference to FIG. 3.

Figure 3:
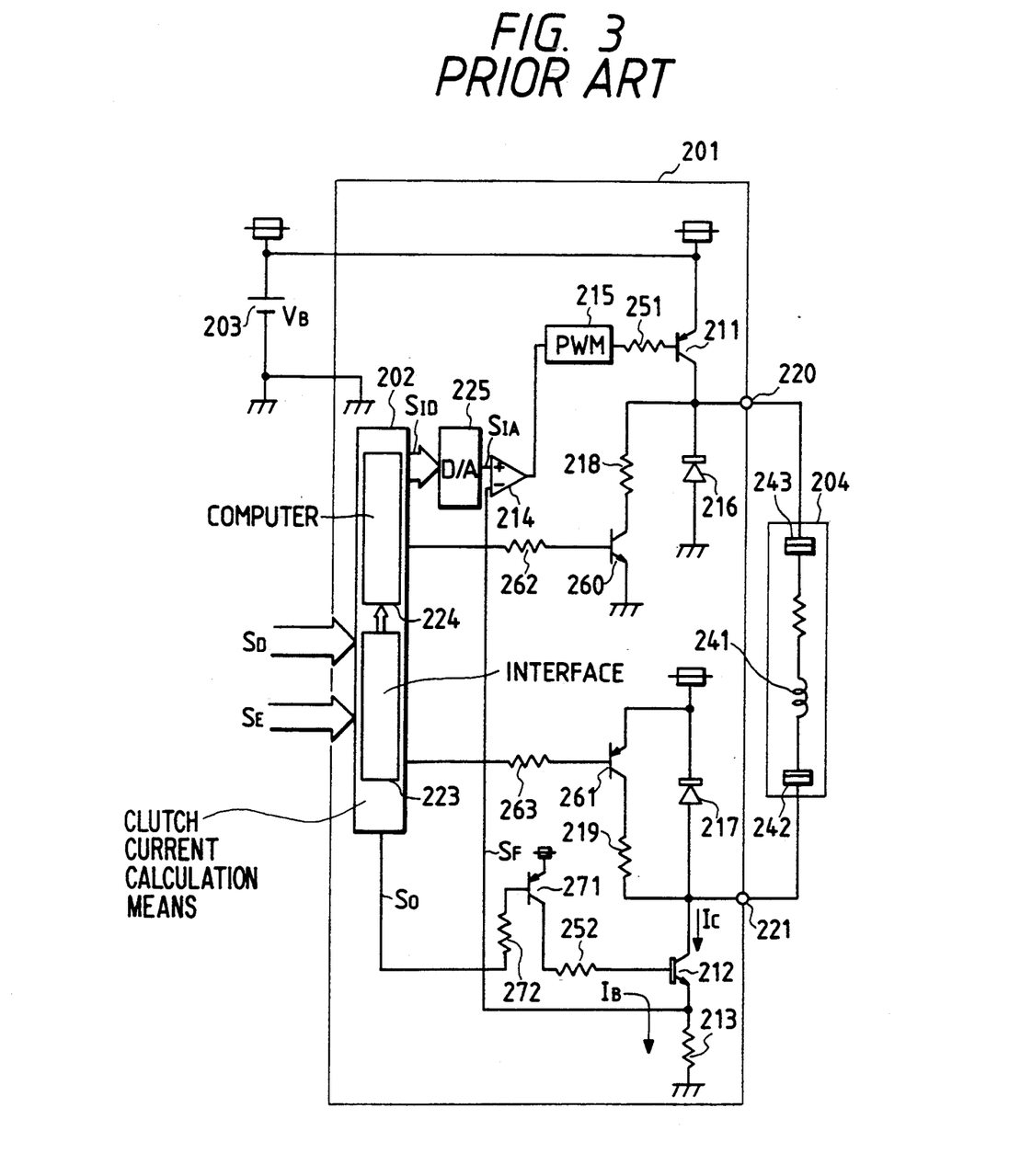
FIG. 3 is a circuit diagram, partly as a block diagram, showing another example of the conventional vehicle electromagnetic clutch control device.

In FIG. 3, reference numeral 201 designates clutch current control means, which includes clutch current calculating means 202. The latter 202 has an interface 223 and a computer 224.

In the clutch current calculating means 202, travel control data SD and engine control data SE are applied through the interface 223 to the computer 224. The computer 224 forms a clutch current digital instruction signal SID according to the travel control data SD and the engine control data SE. The signal SID is applied to a D/A (digital-to-analog) converter 225, where it is converted into an analog signal, namely, a clutch current analog instruction signal SIA, which is applied to the positive input terminal (+) of a current difference detector 214, to the negative input terminal (−) of which a clutch current feedback signal SF provided at one terminal of current detecting means, namely, a current detecting resistor 213 is applied.

Thus, the current difference detector 214 obtains the difference between the clutch current analog instruction signal SIA and the clutch current feedback signal SF, to output a difference signal. The difference signal is applied through a PWM (pulse width modulation) modulator 215 and a resistor 251 to the base of an output transistor 211.

The emitter of the output transistor 211 is connected to a power supply line, to which the positive terminal of a power source 203 is connected. The negative terminal of the power source 203 is grounded. The collector of the output transistor 211 is grounded through a feedback diode 216, which is shunted by a series circuit of a deexciting resistor 218 and a deexciting current control transistor 260. The collector of the output transistor 211 is connected to an output terminal 220.

The output terminal 220 is connected through an electro-magnetic clutch 204 to another output terminal 221. The electromagnetic clutch 204 comprises slip springs 242 and 243, and a clutch coil 241. Clutch current is supplied through the slip rings 242 to the clutch coil 241.

The aforementioned clutch current calculating means 202 outputs a clutch release signal SO, which is applied through a resistor 272 to the base of a base control transistor 271. The collector of the transistor 271 is connected through a base resistor 252 to the base of an output transistor 212, and the emitter of the transistor 271 is connected to the power source.

The collector of the output transistor 212 is connected to the output terminal 221, and connected through an over-voltage preventing quick-break diode 217 to the power source, and connected through a deexciting resistor 219 to the collector of a deexciting current control transistor 261. The emitter of the output transistor 212 is grounded through the aforementioned current detecting resistor 213. The current detecting resistor 213 is used to detect a clutch current.

The above-described clutch current calculating means 202 supplies deexciting instruction signals through resistors 262 and 263 to the deexciting current control transistors 260 and 261, respectively. The emitter of the transistor 260 is grounded. The emitter of the transistor 261 is connected to the power source.

The operation of the vehicle electromagnetic clutch control device thus organized will be described.

A control unit (not shown) calculates a vehicle speed, and an engine speed (a number of revolutions per minute of an engine). In accordance with the vehicle speed and the engine speed, the aforementioned travel control data SD is applied to the clutch current calculating means 202.

The clutch current calculating means 202 further receives the engine control data SE. In response to the travel control data SD and the engine control data SE, the clutch current calculating means 202 calculates clutch torque to output the clutch current digital instruction signal SID.

The clutch current digital instruction signal SID is applied to the D/A converter 225, where it is converted into the clutch analog instruction signal SIA. The signal SIA is applied to the positive input terminal (+) of the current difference detector 214, to the negative input terminal (−) of which the clutch current feedback signal SF provided at the one terminal of the current detecting resistor 213 is applied. Thus, the current difference detector 214 outputs the difference signal between the clutch current analog instruction signal SIA and the clutch current feedback signal SF.

The difference signal is applied to the PWM modulator 215, where it is subjected to pulse width modulation (PWM). The output of the PWM modulator is applied through the resistor 251 to the base of the output transistor 211. That is, the output transistor 211 is rendered on and off depending on the pulse width with which the difference signal is modulated by the PWM modulator 215. When the output transistor 11 is rendered conductive (on) or non-conductive (off) in this manner, the clutch current is allowed or not allowed to flow to the electromagnetic clutch 204 through the output terminal 220. At the engagement of the electromagnetic clutch 204, both the deexciting current control transistors 260 and 261 are rendered non-conductive (off).

On the other hand, during the ordinary clutch engagement, the output transistor 212 is rendered conductive (on). For this purpose, the clutch current calculating means 202 outputs the clutch current release signal SO to render the base control transistor 271 conductive (on), so that the output transistor 212 is rendered conductive (on). Thus, when the output transistor 211 is turned on by the difference signal pulse-modulated by the PWM modulator 215, the clutch current flows in a closed loop of the output transistor 211, the output terminal 220, the electromagnetic clutch 204, the output terminal 221, the output transistor 212, the current detecting resistor 213, and ground.

In this operation, the clutch current feedback signal SF provided at the one terminal of the current detecting resistor 213 is applied to the negative input terminal (−) of the current difference detector 214.

Thus, in accordance with the PWM signal, which is provided by pulse-width modulation of the difference signal outputted by the current difference detector 214, the clutch current is allowed to flow in the electromagnetic clutch 204 to activate the latter.

On the other hand, the electromagnetic clutch 4 is released by the clutch release signal SO outputted by the clutch current calculating means 202. The output transistor 212 is normally kept rendered conductive (on), and the release of the clutch is controlled by the clutch release signal SO. The clutch release signal SO is outputted by the clutch current calculating means 202, and applied through the base resistor 272 to the base of the base control transistor 271, to render the latter 271 conductive (on). When the base control transistor 271 is turned on in this way, the collector potential is decreased, and the output transistor 212 is therefore turned off. When the output transistor 212 is rendered non-conductive in this manner, the clutch current is interrupted, so that the clutch is released.

When both the transistors 211 and 212 are rendered non-conductive (off), a deexciting current is allowed to flow in the direction opposite to the direction of the clutch current IC, to release the clutch. For this purpose, the clutch current calculating means 202 outputs a deexciting instruction signal, which is applied through the resistors 262 and 263 to the deexciting current control transistors 260 and 261, respectively. As a result, both the transistors 260 and 261 are rendered conductive (on), so that the deexciting current is supplied from the power source through the deexciting resistors 218 and 219 to the electromagnetic clutch 204 in the direction opposite to the direction of the clutch current IC. Thus, when the clutch is released, its residual torque can be corrected.

The conventional vehicle electromagnetic clutch control device is designed as described above. In order to detect the clutch current IC, the voltage drop by the clutch current flowing in the current detecting resistor 213 connected to the emitter of the output transistor 212 is detected.

Hence, when the output transistor 212 is conductive (on), the base current IB of the output transistor 212 flows in the current detecting resistor 213. As a result, the detected current is deviated in value from the true clutch current. That is, the conventional vehicle electromagnetic clutch control device suffers from problems that the clutch current is not accurately controlled, and the control of small torque is not satisfactorily carried out.

SUMMARY OF THE INVENTION

Accordingly, an object of this invention is to eliminate the above-described difficulties accompanying a conventional vehicle electromagnetic clutch control device.

More specifically, an object of this invention is to provide a vehicle electromagnetic clutch control device in which the gain can be adjusted with ease, and no large current flows during the adjustment of gain, and its output transistors are therefore prevented from being damaged.

Another object of the invention is to provide a vehicle electromagnetic clutch control device in which the actual clutch current can be accurately controlled irrespective of the variation of the supply voltage, and the control of small torque can be achieved with high accuracy, which contributes to the provision of a motor vehicle which can be operated smoothly.

The foregoing objects and other objects of the invention have been achieved by the provision of the following vehicle electromagnetic clutch control devices:

(1) A vehicle electromagnetic clutch control device which, according to the invention, comprises: clutch current calculating means for outputting a clutch current signal according to travel control data and engine control data, and outputting a clutch release signal at the time of release of an electromagnetic clutch; a current difference detector for obtaining the difference between the clutch current signal and a clutch current feedback signal; a PWM modulator for outputting a pulse width modulation signal according to an output of the current difference detector; a first output transistor for supplying a clutch current to the electro-magnetic clutch according to the pulse width modulation signal; a second output transistor which is conductive during engagement of the electromagnetic clutch, and is rendered non-conductive when the clutch release signal is produced, to interrupt the clutch current of the electromagnetic clutch; a current detecting resistor for detecting the clutch current which flows when the second output transistor is conductive; and a current detecting amplifier in which a voltage corresponding to the clutch current detected by the current detecting resistor is applied through a reference resistor to an operational amplifier, the clutch current feedback signal is provided with an amplification factor determined by a feedback resistor connected between the input and output of the operational amplifier, and an adjusting resistor is connected in parallel to the reference resistor.

In the device, the adjusting resistor is adjusted in resistance, to reduce the actual clutch current.

(2) A vehicle electromagnetic clutch control device which, according to the invention, comprises: clutch current calculating means for outputting a clutch current instruction signal according to travel control data and engine control data, and outputting a clutch release signal at the time of release of an electromagnetic clutch, and correcting the clutch current instruction signal with a clutch current feedback signal; a current difference amplifier for obtaining the difference between the clutch current instruction signal and the clutch current feedback signal; a PWM modulator for outputting a pulse width modulation signal according to an output of the current difference amplifier; a first output transistor which is rendered conductive or non-conductive according to the pulse width modulation signal, to supply a clutch current to the electro-magnetic clutch; a second output transistor which is rendered conductive or non-conductive according to the clutch release signal, to apply the clutch current to a current detecting resistor; a deexciting resistor for supplying a deexciting current to the electromagnetic clutch when the second output transistor is non-conductive; and current detecting amplifier means for amplifying a voltage across the current detecting resistor to supply the clutch current feedback signal to the current difference amplifier and the clutch current calculating means.

In the control device, the clutch current calculating means outputs the clutch current instruction signal and the clutch release signal according to the engine control data and the travel control data, and the first output transistor is controlled according to the difference between the clutch current instruction signal and the clutch current feedback signal, and the second output transistor is controlled according to the clutch release signal, to apply the clutch current to the current detecting resistor. A voltage drop across the current detecting resistor is amplified by the current detecting amplifier means, to provide the clutch current feedback signal, which is applied to the clutch current calculating means. In response to the clutch current feedback signal, the clutch current calculating means corrects the clutch current instruction signal corresponding to the clutch torque which is obtained according to the travel control data and the engine control data. Therefore, it is unnecessary to adjust the amplification factor of the current detecting amplifier means.

(3) A vehicle electromagnetic clutch control device which, according to the invention, comprises: clutch current calculating means for outputting a clutch current instruction signal according to travel control data and engine control data, and outputting a clutch release signal at the time of release of an electromagnetic clutch, and correcting the clutch current instruction signal with a clutch current detection value including no clutch current ripples components; a current difference amplifier for obtaining the difference between the clutch current instruction signal and the clutch current feedback signal; a PWM modulator for outputting a pulse width modulation signal according to an output of the current difference amplifier; a first output transistor which is rendered conductive or non-conductive according to the pulse width modulation signal, to supply a clutch current to the electro-magnetic clutch; a second output transistor which is rendered conductive or non-conductive according to the clutch release signal, to apply the clutch current to a current detecting resistor; a deexciting resistor for supplying a deexciting current to the electromagnetic clutch when the second output transistor is non-conductive; current detecting amplifier means for amplifying a voltage across the current detecting resistor to output the clutch current feedback signal; and a clutch current averaging filter for receiving the clutch current feedback signal, to apply the clutch current detection value to the clutch current calculating means.

Also in the control device, the clutch current calculating means outputs the clutch current instruction signal and the clutch release signal according to the engine control data and the travel control data, and the first output transistor is controlled according to the difference between the clutch current instruction signal and the clutch current feedback signal, and the second output transistor is controlled according to the clutch release signal, to apply the clutch current to the current detecting resistor. A voltage drop across the current detecting resistor is amplified by the current detecting amplifier means, to provide the clutch current feedback signal, which is applied to the clutch current averaging filter to remove ripple components therefrom, to provide the clutch current detection value. Upon reception of the clutch current detection value, the clutch current calculating means corrects the clutch current instruction signal.

(4) A vehicle electromagnetic clutch control device which, according to the invention, comprises: clutch current calculating means for outputting a clutch current instruction signal according to travel control data and engine control data, and outputting a clutch release signal at the time of release of an electromagnetic clutch, and storing a base current of a first transistor corresponding to a supply voltage, to correct the clutch current instruction signal according to a variation of the supply voltage; a current difference detector for obtaining the difference between the clutch current instruction signal and a clutch current feedback signal; a PWM modulator for outputting a pulse width modulation signal according to an output of the current difference detector; a second output transistor which operates according to the pulse width modulation signal, to supply a clutch current to the electromagnetic clutch in cooperation with the first output transistor; current detecting means for detecting the clutch current flowing when the first output transistor is conductive, to apply the clutch current feedback signal to the current difference detector; and supply voltage detecting means for detecting a supply voltage and feeding the supply voltage thus detected back to the clutch current calculating means.

In the control device, the base currents of the output transistor according to the supply voltages are stored in advance, and the clutch current calculating means corrects the clutch current instruction signal by adding the base current according to the supply voltage detected by the supply voltage detecting means.

The nature, utility and principle of the invention will be more clearly understood from the following detailed description and the appended claims when read in conjunction with the accompanying drawing.

DETAILED DESCRIPTION OF THE PREFERRED EMBODIMENTS

Preferred embodiments of this invention will be described with reference to the accompanying drawings.

Figure 4:
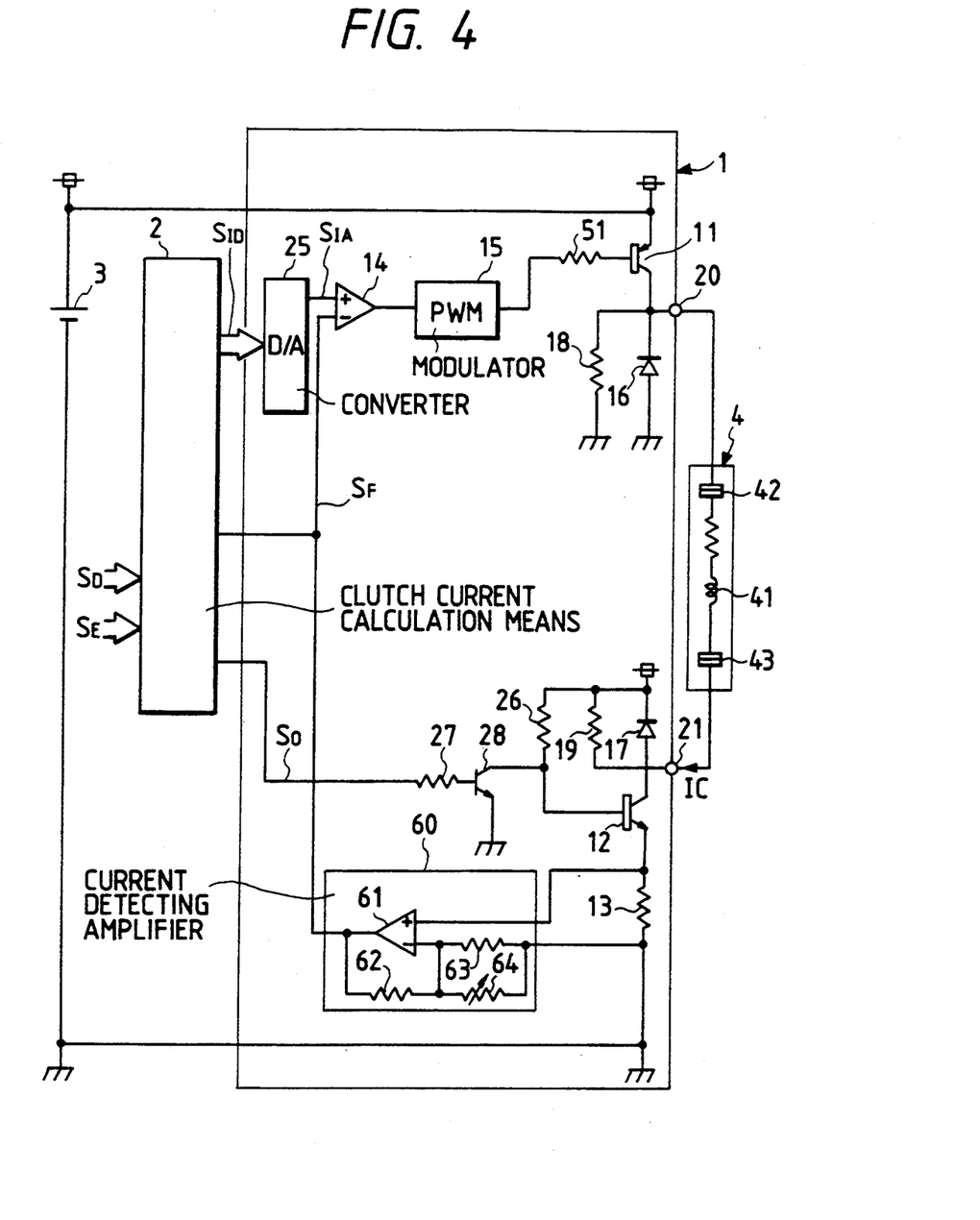
FIG. 4 is a circuit diagram, partly as a block diagram, showing a first example of a vehicle electromagnetic clutch control device according to this invention.

A first example of a vehicle electromagnetic clutch control device according to the invention is as shown in FIG. 4. In FIG. 4, parts corresponding functionally to those which have been already described with reference to FIG. 1 are therefore designated by the same reference numerals or characters. Hence, mainly parts different from those in FIG. 1 will be described.

As is apparent from comparison of FIG. 4 with FIG. 1, the device shown in FIG. 4 is different from the one shown in FIG. 1 only in the arrangement of the current detecting amplifier 60. That is, in the current detecting amplifier 60, an adjusting resistor 64 is connected in parallel to the reference resistor 63.

The operation of the device thus organized will be described. However, a description of the operations of the parts which are the same as those in the conventional device shown in FIG. 1 is omitted; that is, mainly the operation of the current detecting amplifier 60 will be described.

The clutch current flows in the current detecting resistor 13 through the output transistor 12, so that a voltage drop occurs across the current detecting resistor 13. The voltage drop is applied to the positive input terminals (+) and negative input terminal (−) of the operational amplifier 61. More specifically, the voltage at the one terminal of the current detecting resistor 13 which is connected to the output transistor 12 is applied directly to the positive input terminal (+) of the operational amplifier 61, while the voltage at the other terminal of the current detecting transistor 13 which is grounded is applied through a parallel circuit of the reference resistor 63 and the adjusting resistor 64 to the negative input terminal (−) of the operational amplifier 61.

The current detecting amplifier 60 provides the clutch current feedback signal SF with the aid of the reference resistor 63, the adjusting resistor 64, the feedback resistor 61, and with the amplification factor on the voltage drop developed across the current detecting resistor 13 by the clutch current. Thus, the clutch current feedback signal SF can be adjusted by controlling the adjusting resistor 64.

In adjustment of the clutch current feedback signal SF, the following equation (1) is established:

$$SIA = SF \qquad (1)$$

In the conventional device shown in FIG. 1, the clutch current analog signal SIA and the clutch current feedback signal SF relate to each other as follows:

$$SIA = SF = IC \times RB \times (1 + R62/R63) \qquad (2)$$

where IC is the clutch current, RB is the resistance of the current detecting resistor 13, R62 is the resistance of the feedback resistor 62, and R63 is the resistance of the reference resistor 63.

On the other hand, in the device of the invention, the clutch current analog signal SIA and the clutch current feedback signal SF relate to each other as follows:

$$\begin{aligned}SIA = SF &= IC \times RB[1 + \{R62(R63 + R64)/(R63 \times R64)\}] \\ &= IC \times RB[1 + R62/R63\{1 + (R63/R64)\}]\end{aligned} \qquad (3)$$

where R64 is the resistance of the adjusting resistor 64.
The actual clutch current IC is as follows:

$$IC = SIA/RB\,[1 + R62/R63\,\{1 + R63/R64)\}] \qquad (4)$$

As is apparent from Equation (4), as the resistance R64 of the adjusting resistor 64 decreases, the actual clutch current IC is decreased; that is, the current adjustment can be achieved.

As was described above, the first example of the vehicle electromagnetic clutch control device of the invention is so designed as to control the clutch current by adjusting the adjusting resistor connected in parallel to the reference resistor in the current detecting amplifier. Therefore, the clutch current can be adjusted without removal of the reference resistor and the feedback resistor from the printed circuit board.

Furthermore, the clutch current can be generally determined with the reference resistor and the feedback resistor before adjusted. Hence, in the adjustment of the clutch current, no large current flows in the clutch, and accordingly the output transistors are prevented from being damaged by large current.

Figure 5:
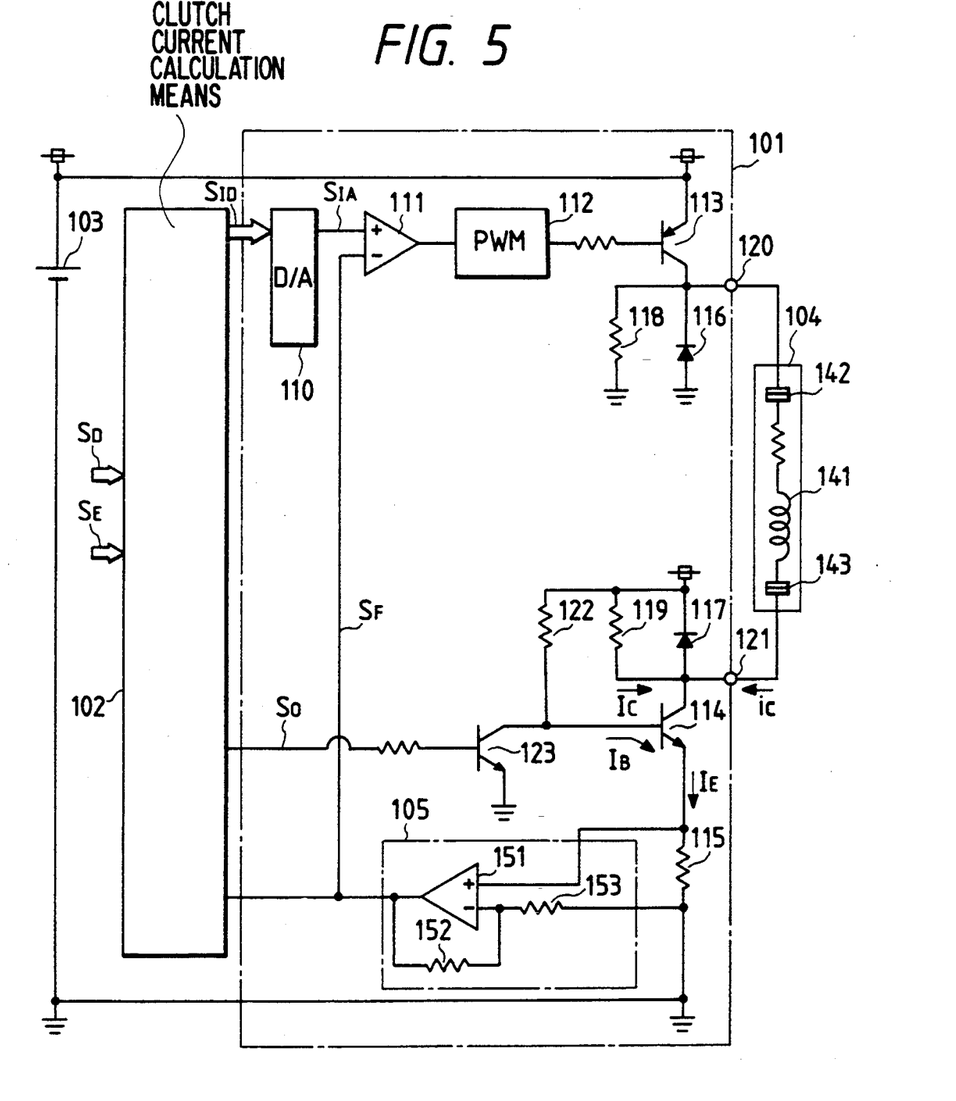
FIG. 5 is a circuit diagram, partly as a block diagram, showing a second example of the vehicle electromagnetic clutch control device according to the invention.

A second example of the vehicle electromagnetic clutch control device is as shown in FIG. 5.

As is apparent from comparison of FIG. 5 with FIG. 4, the device shown in FIG. 5 is different from the one shown in FIG. 4 in that its current detecting amplifier means 105 has no adjusting resistor, and the clutch current feedback signal SF outputted by the current detecting amplifier means 105 is applied to the negative input terminal (−) of a current difference amplifier 111 and to the clutch current calculating means 102.

Figure 6:
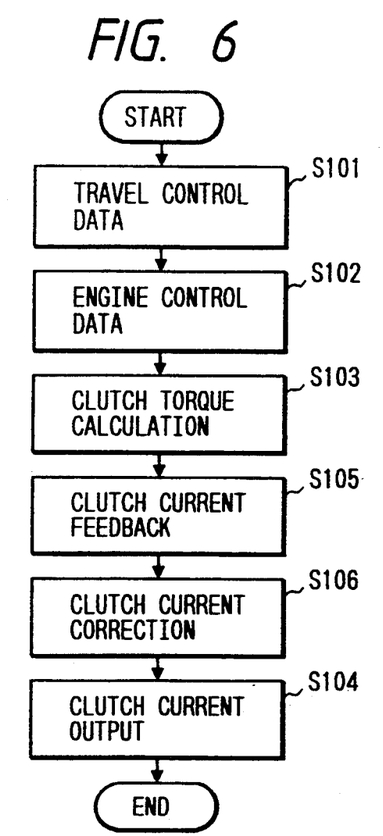
FIG. 6 is a flow chart for a description of the operation of the vehicle electromagnetic clutch control device shown in FIG. 5.

The operation of the control device thus organized will be described with reference to a flow chart of FIG. 6. However, a description of the operations of parts which are the same as those in FIG. 4 is omitted, and mainly operations different from those in the device shown in FIG. 4 will be described.

A vehicle speed and an engine speed (rpm) are calculated by a control device not shown. In Step 101, the clutch current calculating means 2 inputs a travel control data SD in response to the vehicle speed and the engine speed. Next, the clutch current calculating means 2 inputs an engine control data SE in Step 2.

In Step S103, the clutch current calculating means calculates clutch torque, to provide the clutch current digital instruction signal SID. The signal SID is applied to the D/A converter 110, where it is converted into the clutch current analog instruction signal SIA. The signal SIA is applied to the positive input terminal of the current difference amplifier 111, to the negative input terminal (−) of which the clutch current feedback signal SF provided at the output terminal f the current detecting amplifier means is applied. The signal SF is further applied to the clutch current calculating means 102 (Step S105).

Thus, in Step S106, the clutch current calculating means 102 corrects the above-described clutch current digital instruction signal SID obtained from the travel control data SD and the engine control data SE.

Figure 7:
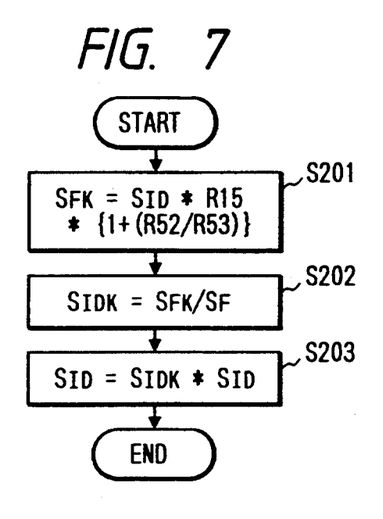
FIG. 7 is a flow chart for a description of the correction of clutch current by clutch current calculating means in the vehicle electromagnetic clutch control device shown in FIG. 5.

The correction of the clutch current digital instruction signal SID will be described with reference to a flow chart of FIG. 7.

A clutch current correcting coefficient SIDK for the clutch current digital instruction signal SID is as follows:

$$SIDK = SFK/SF \qquad (11) \text{ (sic)}$$

where SFK is the reference value of the clutch current feedback signal.

The reference value SFK can be obtained from the following equation (12) in Step S201:

$$SFK = SID \times R15 \times \{1 + (R52/R53)\} \qquad (12)$$

where R15 is the resistance of the current detecting resistor 115, R51 is the resistance of the feedback resistor 152 in the current detecting amplifier means 105, and R53 is the resistance of the reference resistor 53.

Therefore, in Step S203, the clutch current digital instruction signal SID is provided as follows:

$$SID = SIDK \times SID \qquad (13)$$

As is apparent from the above description, the clutch current digital instruction signal SID can be corrected by feeding the clutch current feedback signal SF outputted by the current detecting amplifier means 105 back to the clutch current calculating means 102.

The clutch current digital instruction signal SID thus corrected is applied to the D/A converter 110, where it is converted into the clutch current analog instruction signal SIA, which is applied to the current difference amplifier 111. The latter 111 obtains the difference between the clutch current analog instruction signal SIA and the clutch current feedback signal SF, to output the difference signal. The difference signal is applied to the PWM modulator 112, where it is subjected to pulse width modulation (PWM). The output of the PWM modulator 112 is applied through a resistor to the base of an output transistor 113.

Thus, depending on the pulse width with which the difference signal is pulse-modulated in Step S104 (FIG. 6), the clutch current is allowed to flow through the output terminal 120 or not allowed. Thereafter, the device operates in the same way as the device shown in FIG. 4 are carried out.

In the vehicle electromagnetic clutch control device of the invention, the current detecting amplifier means amplifies the voltage drop developed across the current detecting resistor by the clutch current, to apply the clutch current feedback signal to the clutch current calculating means, so that the latter corrects the clutch current instruction signal in accordance with the clutch torque obtained from the travel control data and the engine control data. Therefore, it is unnecessary to adjust the amplification factor of the current detecting amplifier means.

Figure 8:
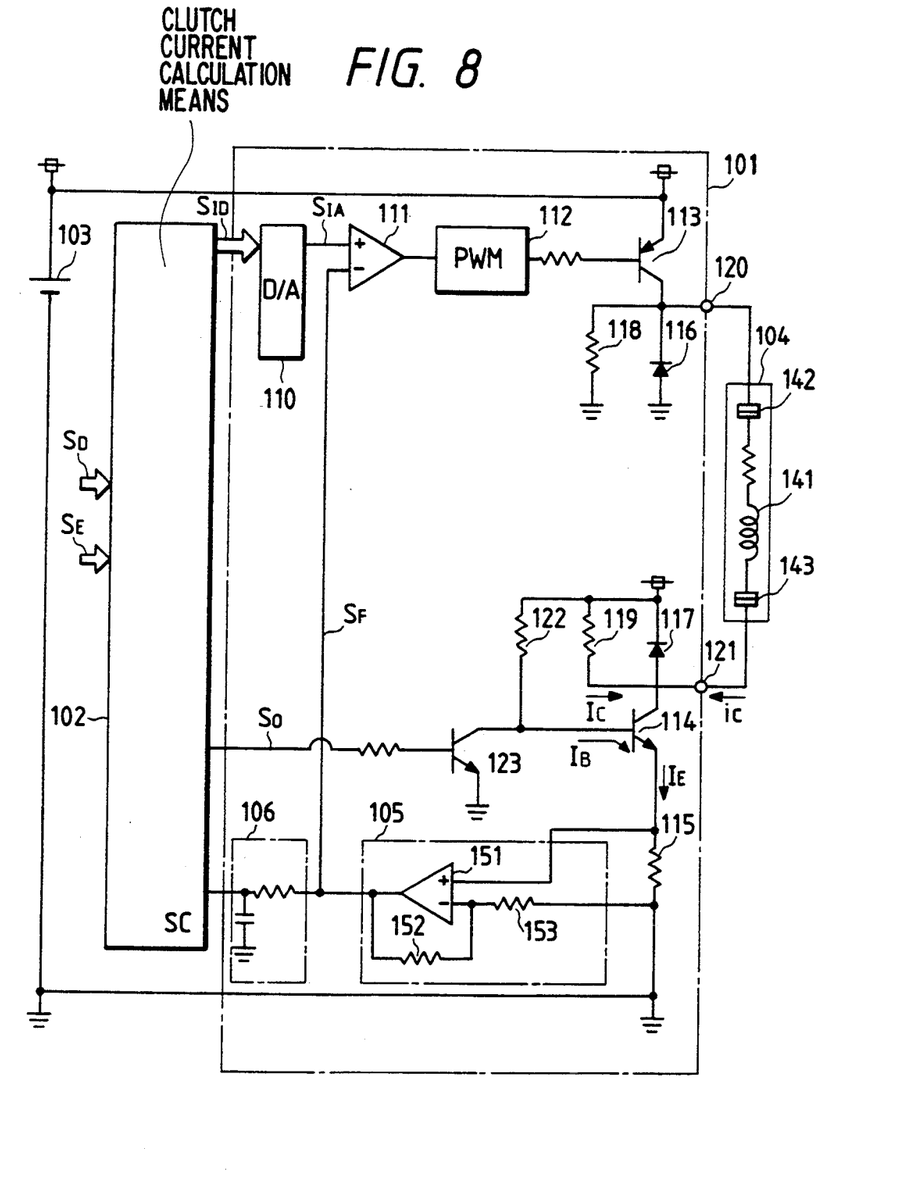
FIG. 8 is a circuit diagram, partly as a block diagram, showing a third example of the vehicle electromagnetic clutch control device according to the invention.

A third example of the vehicle electromagnetic clutch control device according to the invention will be described with reference to FIG. 8. As is apparent from comparison of FIG. 8 to FIG. 5, the control device shown in FIG. 8 is obtained by adding a clutch current averaging filter 106 to the device shown in FIG. 5.

The clutch current averaging filter 106 is connected between the output terminal of the current detecting amplifier means 105 and the clutch current calculating means 102, so as to remove clutch current ripple components from the clutch current feedback signal SF outputted by the current detecting amplifier means 105, to provide a clutch current detection value SC. The clutch current detection value SC thus provided is applied to the clutch current calculating means 102. Thus, in the control device, the clutch current calculating means 102 receives the travel control data SD, the engine control data SE, and the clutch current detection value CS.

Figure 9:
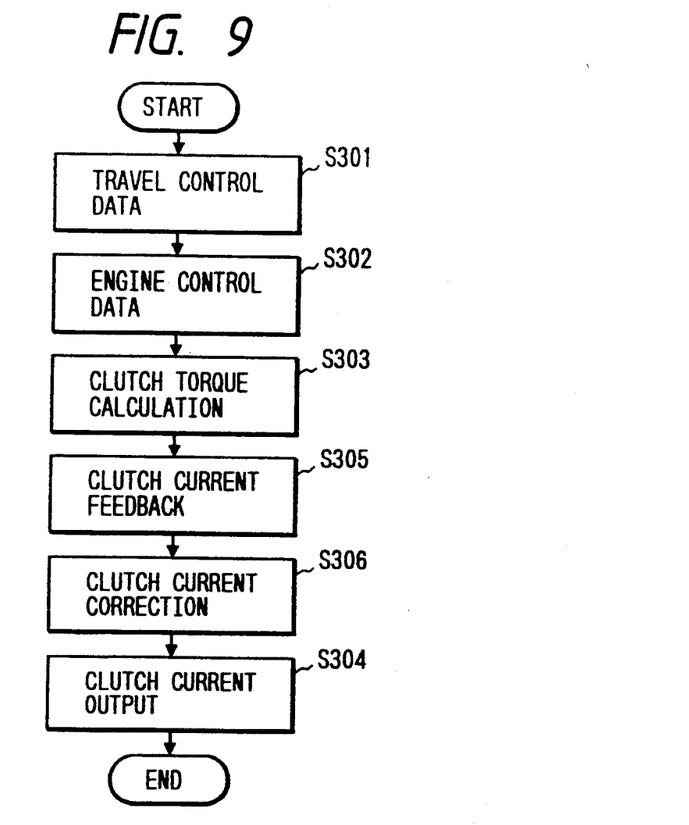
FIG. 9 is a flow chart for a description of the operation of the vehicle electromagnetic clutch control device shown in FIG. 8.

The operation of the control device thus organized will be described with reference to a flow chart of FIG. 9 showing the control of the clutch current calculating means 102.

In Step S301, the travel control data SD is applied to the clutch current calculating means S102. In Step 302, the engine control data SE is applied to the clutch current calculating means 102. In Step S303, the clutch current calculating means 102 utilizes the travel control data SD and the engine control data SE to calculate clutch torque.

In Step S305, similarly as in the case of the device shown in FIG. 5, the current detecting amplifier means 105 outputs the clutch current feedback signal SF, which is applied to the negative input terminal (−) of the current difference amplifier 111 and to the clutch current averaging filter 106.

When the clutch current feedback signal SF is applied to the clutch current averaging filter 106 in this manner, the clutch current SC is applied to the clutch current calculating means 102 which is obtained by removing the clutch current ripple components from the signal SF as was described above. Upon reception of the detection value SC, in Step S306 the clutch current calculating means 102 corrects the clutch current digital instruction signal SID in correspondence to the clutch torque obtained according to the travel control data SD and the engine control data SE.

Figure 10:
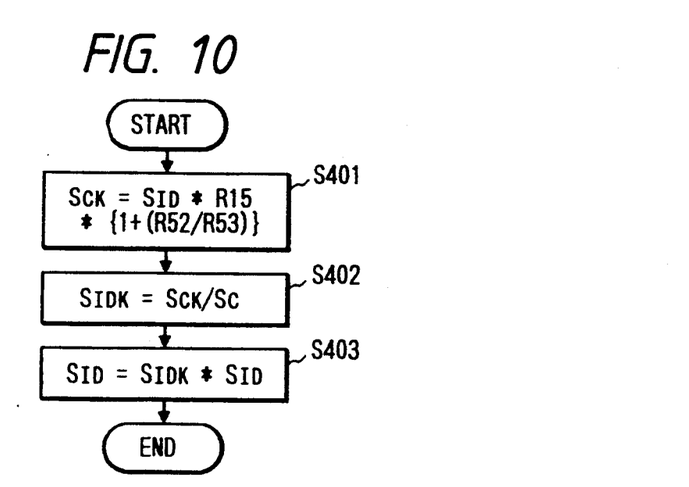
FIG. 10 is a flow chart for a description of the correction of clutch current by clutch current calculating means in the vehicle electromagnetic clutch control device shown in FIG. 8.

The correction of the clutch current digital instruction signal SID will be described with reference to a flow chart of FIG. 10 in more detail.

In Step S402, a clutch current correcting coefficient SIDK for the clutch current digital instruction signal SID is as follows:

$$SIDK = SCK/SC \qquad (14)$$

where SCK is the clutch current detecting reference value.

The clutch current detecting reference value SCK is represented by the following Equation (15) in Step S401:

$$SCK = SID \times R15 \times \{1 + (R52/R53)\} \quad (15)$$

where R15 is the resistance of the current detecting resistor 115, R52 is the resistance of the feedback resistor 152, and R53 is the resistance of the reference resistor 153.

Therefore, in Step S403 the clutch current digital instruction signal SID is:

$$SID = SIDK \times SID \quad (16)$$

Thus, upon reception of the clutch current detection value SC from the clutch current averaging filter 106, the clutch current calculating means 102 corrects the clutch current digital instruction signal SID in correspondence to the clutch torque obtained according to the travel control data SD and the engine control data SE.

The clutch current digital instruction signal SID thus corrected is applied to the D/A converter 110, where it is converted into the clutch current analog instruction signal SIA, which is applied to the current difference amplifier 111. The latter 111 obtains the difference between those signals SID and SIA, to provide the difference signal, which is applied to the PWM modulator 112, where it is subjected to pulse width modulation (PWM). The output of the PWM modulator 112 is applied through the resistor to the base of the output transistor 113, so that, in Step S304 (FIG. 9), the clutch current is allowed to flow from the output terminal 120 or not.

In the third example of the vehicle electromagnetic clutch control device of the invention, the clutch current feedback signal provided by the current detecting amplifier means is applied to the clutch current averaging filter, whereby the clutch current detection value having no clutch current ripple components is applied to the clutch current calculating means, so that the latter corrects the clutch current instruction signal in accordance with the clutch torque obtained from the travel control data and the engine control data. Hence, the clutch can be controlled with high accuracy, and the vehicle can be operated smoothly.

A fourth example of the vehicle electromagnetic clutch control device according to the invention will be described with reference to FIG. 11.

Figure 11:
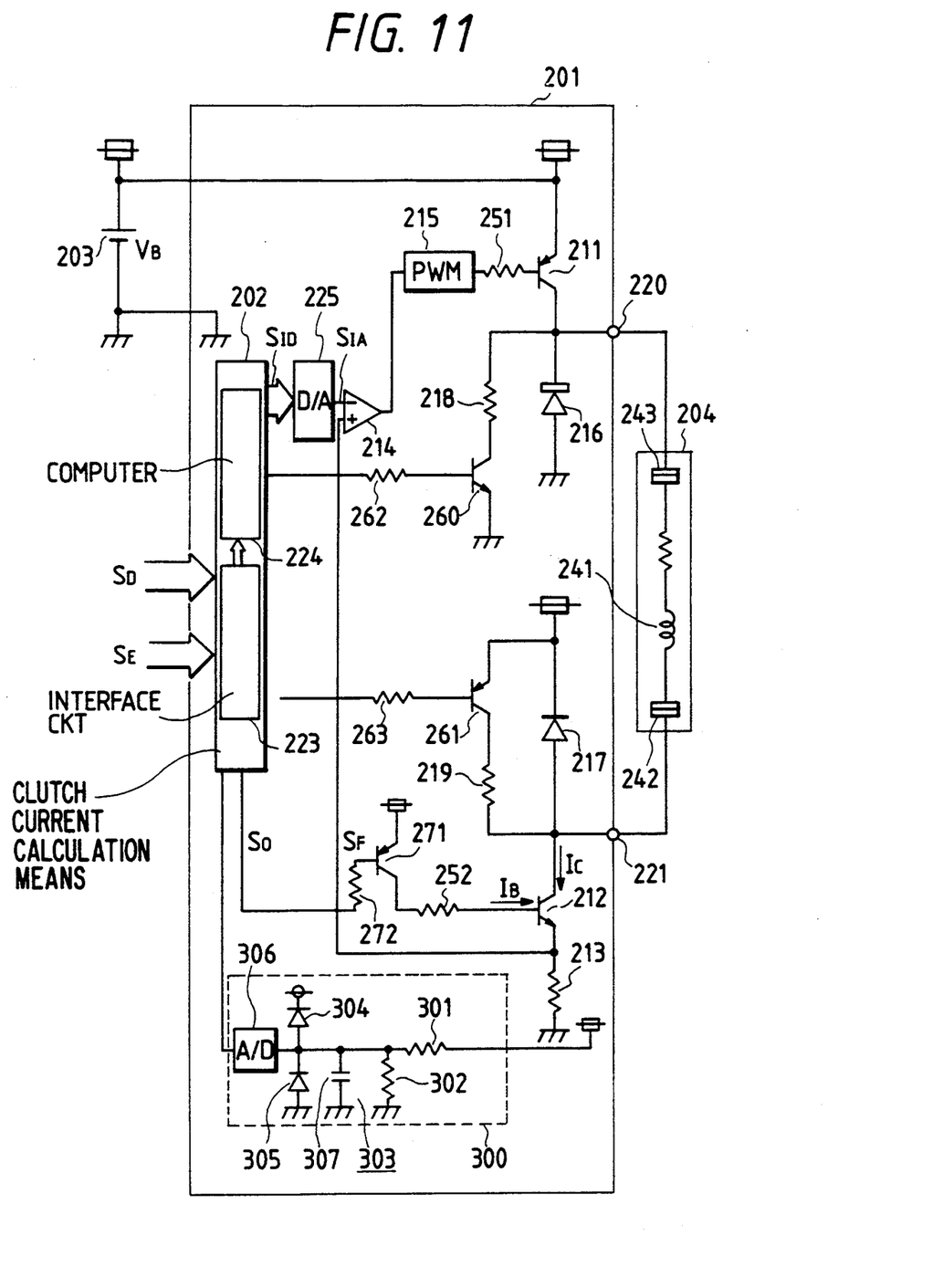
FIG. 11 is a circuit diagram, partly as a block diagram, showing a fourth example of the vehicle electromagnetic clutch control device according to the invention.

As is apparent from comparison of FIG. 11 with FIG. 3 the control device shown in FIG. 11 is obtained by adding supply voltage detecting means 300 to the control device shown in FIG. 3.

In the supply voltage detecting means 300, a series circuit of voltage dividing resistors 301 and 302 is connected between the power source and ground, and a capacitor 307 is connected in parallel to the voltage dividing resistor 302. The resistor 302 and the capacitor 307 form a filter 303. Furthermore, a series circuit of over-voltage preventing diodes 304 and 305 is connected between the power source and ground. The diode 305 is connected in parallel to the aforementioned capacitor 307. The connecting point of the diodes 304 and 305 is connected to the input terminal of an analog-to-digital (A/D) converter 306, the output terminal of which is connected to the clutch current calculating means 202. The other arrangement of the control device is that same as that of the control device shown in FIG. 3.

Figure 12:
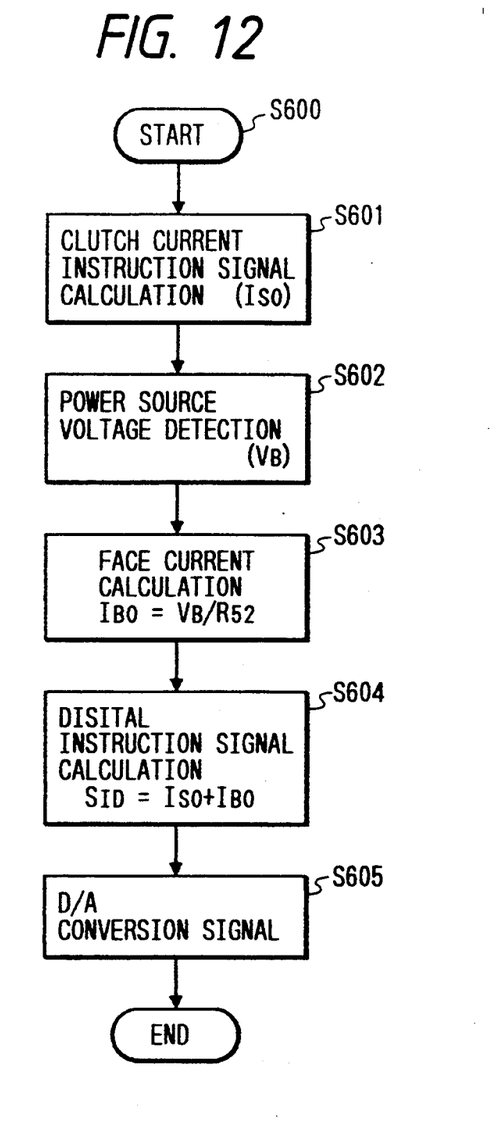
FIG. 12 is a flow chart for a description of the operation of the vehicle electromagnetic clutch control device shown in FIG. 11.

The operation of the vehicle electromagnetic clutch control device will be described with reference to a flow chart of FIG. 12. However, the operations of parts which are the same as those in FIG. 3 will be described in brief, and mainly the operation of the supply voltage detecting means 300 will be described.

In Step S600, the starting operation is carried out. In Step S601, the clutch current calculating means 202 outputs the clutch current digital instruction signal SID according to the travel control data SD and the engine control data SE. Similarly as in the case of the control device shown in FIG. 3, the output transistor 211 controls the clutch current in accordance with the output signal of the PWM modulator 215.

In the engagement of the electromagnetic clutch 204, the other output transistor 212 is rendered conductive (on). For this purpose, the clutch current calculating means 202 provides the clutch release signal SO at a predetermined level, which is applied to the base control transistor 271, to render the latter conductive (on). As a result, the base current is supplied from the collector of the base control transistor 271 through the base resistor 252 to the base of the output transistor 212, to render the latter 212 conductive (on).

As a result, the clutch current flows from the output transistor 211 to the electromagnetic clutch 204 and flows through the output transistor 212 to the current detecting resistor 213, so that a voltage drop is developed across the resistor 213 according to the clutch current.

In this operation, the current flowing in the current detecting resistor 213 is the sum of the base current IB of the output transistor 212 and the clutch current IC. In the clutch current feedback signal SF applied to the negative input terminal (−) of the current difference detector 214 from the one terminal of the current detecting resistor 213 which is connected to the emitter of the output transistor 212, the base current IB results in a detection error.

The base current IB flows from the power source 203 through the base control transistor 271 and the base resistor 252 to the base of the output transistor 212, and therefore it changes with the supply voltage. In this case, in the clutch current feedback signal SF, it appears as a variation in detection error.

In the control device, in Step S602, the voltage of the power source 203 is detected with the voltage dividing resistors 301 and 302 in the supply voltage detecting means 300. The voltage developed across the voltage dividing resistor 302 is converted into a digital signal by the A/D converter 306, which is fed back to the clutch current calculating means 202.

The base current IB of the output transistor 212 according to the supply voltage is stored in memory in the clutch current calculating means 202 in advance. When the supply voltage detecting means 300 detects a change in the supply voltage, in Step S603 the base current IBO of the output transistor 212 is calculated from the following equation (21):

$$IBO = V_B / R52 \quad (21)$$

where $V_B$ is the supply voltage, and R52 is the resistance of the base resistor 252.

In Step S604, in the clutch current calculating means 202, the base current IBO thus calculated is added to the base current provided when the supply voltage is maintained unchanged, to obtain the clutch current digital instruction signal SID as follows:

$$SID = ISO + IBO \qquad (22)$$

In Step S605, the clutch current digital instruction signal SID thus calculated is applied to the D/A converter 225, where it is converted into the clutch current analog instruction signal SIA, which is applied to the current difference detector 214. The latter 214 obtains the difference between the clutch current analog instruction signal SIA and the clutch current feedback signal SF applied thereto through the one terminal of the current detecting resistor 213. In this operation, the component of variation in the clutch current feedback signal SF is canceled out which includes the variation in base current of the output transistor 212 which is due to the variation in supply voltage. As a result, the clutch current error is minimized.

In the fourth example of the vehicle electromagnetic clutch control device of the invention, the base currents of the output transistor according to the supply voltages are stored in advance, and the supply voltage detected by the supply voltage detecting means is fed back to the clutch current calculating means, so that the clutch current calculating means corrects the clutch current according to the supply voltage. Therefore, with the control device, the actual clutch current can be accurately corrected with respect to the clutch current value specified by the clutch current calculating means; that is, the clutch current can be controlled with high accuracy. Accordingly, the torque control is also carried out with high accuracy being free from the variation of supply voltage. Thus, the vehicle can be operated smoothly and comfortably.

While there has been described in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed:

1. A vehicle electromagnetic clutch control device comprising:
   clutch current calculating means for outputting a clutch current signal according to travel control data and engine control data, and for outputting a clutch release signal at a time of release of an electromagnetic clutch;
   a current difference detector for obtaining the difference between said clutch current signal and a clutch current feedback signal;
   a PWM modulator for outputting a pulse width modulation signal according to an output of said current difference detector;
   a first output transistor for supplying a clutch current to said electromagnetic clutch according to said pulse width modulation signal;
   a second output transistor which is conductive during engagement of said electromagnetic clutch, and is rendered non-conductive when said clutch release signal is produced, to interrupt said clutch current of said electro-magnetic clutch;
   a current detecting resistor for detecting said clutch current which flows when said second output transistor being conductive; and
   a current detecting amplifier in which a voltage corresponding to said clutch current detected by said current detecting resistor is applied through a reference resistor to an operational amplifier, said clutch current feedback signal is provided with an amplification factor determined by a feedback resistor connected between the input and output of said operational amplifier, and an adjusting resistor is connected in parallel to said reference resistor.

2. A vehicle electromagnetic clutch control device comprising:
   clutch current calculating means for outputting a clutch current instruction signal according to travel control data and engine control data, and for outputting a clutch release signal at a time of release of an electromagnetic clutch, and correcting said clutch current instruction signal with a clutch current feedback signal;
   a current difference amplifier for obtaining the difference between said clutch current instruction signal and said clutch current feedback signal;
   a PWM modulator for outputting a pulse width modulation signal according to an output of said current difference amplifier;
   a first output transistor which operates according to said pulse width modulation signal, to supply a clutch current to said electro-magnetic clutch;
   a second output transistor which operates according to said clutch release signal, to apply said clutch current to a current detecting resistor;
   a deexciting resistor for supplying a deexciting current to said electromagnetic clutch when said second output transistor is non-conductive; and
   current detecting amplifier means for amplifying a voltage across said current detecting resistor to supply said clutch current feedback signal to said current difference amplifier and said clutch current calculating means.

3. A vehicle electromagnetic clutch control device comprising:
   clutch current calculating means for outputting a clutch current instruction signal according to travel control data and engine control data, and for outputting a clutch release signal at a time for release of an electromagnetic clutch, and for storing a value of a base current of a first output transistor corresponding to a supply voltage, to correct said clutch current instruction signal according to a variation of said supply voltage;
   a current difference detector for obtaining the difference between said clutch current instruction signal and a clutch current feedback signal;
   a PWM modulator for outputting a pulse width modulation signal according to an output of said current difference detector;
   a second output transistor which operates according to said pulse width modulation signal, to supply a clutch current to said electromagnetic clutch in cooperation with said first output transistor;
   current detecting means for detecting said clutch current flowing when said first output transistor is conductive, to apply said clutch current feedback signal to said current difference detector; and
   supply voltage detecting means for exclusively detecting variations in a supply voltage and for supplying a detected supply voltage back to said clutch current calculating means, wherein said clutch current calculating means calculates a new base current of said first transistor based upon said detected supply voltage when a variation in said supply voltage is detected, and wherein said clutch current calculating means calculates a corrected clutch current instruction signal based upon said base current corresponding to said supply voltage and said new base current corresponding to said detected supply voltage.

* * * * *